United States Patent Office 3,038,761
Patented June 12, 1962

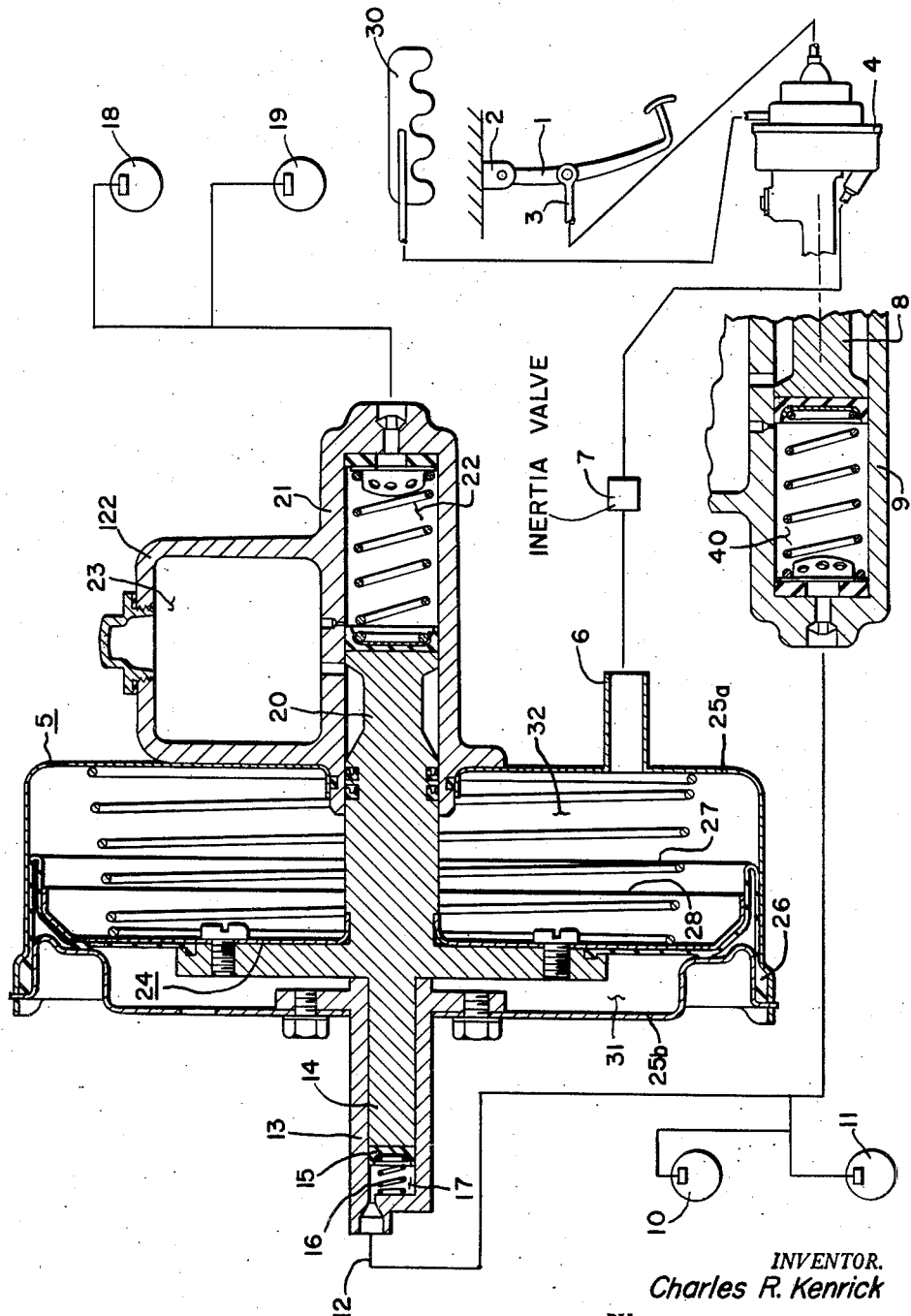

3,038,761
BRAKE BOOSTER CONTROL
Charles R. Kenrick, Bellbrook, Ohio, assignor to General Motors Corporation, Detroit, Mich., a corporation of Delaware
Filed Nov. 27, 1959, Ser. No. 855,823
4 Claims. (Cl. 303—6)

This invention relates to a vehicle braking system and more particularly to a hydraulic means for assisting a vacuum booster unit.

The use of separate braking means on the front wheels and the rear wheels of the motor vehicle assures braking in the event of failure of one of the systems. A further improvement on a dual braking fluid system is provided by having dual booster units with a manually operated front booster unit and a control valve for operating the rear booster unit in proportion to the dynamic weight distribution of the motor vehicle. Such a device is illustrated in the copending application of Calvin J. Werner filed November 27, 1959, Serial No. 855,777, now abandoned. This invention provides an improvement over the copending application by providing an assist for the rear booster unit after the vacuum to the booster unit is cut off responsive to a predetermined rate of deceleration. Accordingly, this invention provides a hydraulic assisting means in communication with the hydraulic system for actuating the front wheel brakes.

It is an object of this invention to provide a hydraulic means for assisting the rear booster unit in actuation of the rear wheel brakes within a braking system employing dual booster.

It is another object of this invention to provide separate brake actuating systems employing dual booster units wherein the hydraulic fluid system for the front wheel brakes assists the booster unit in actuation of the rear wheel brakes.

It is a further object of this invention to provide a hydraulic brake fluid actuating system employing separate fluid systems for the front wheel brakes and the rear wheel brakes operated by vacuum booster units. It is intended that a vacuum control valve cuts off the rear booster unit at a predetermined point of deceleration of the vehicle whereby the hydraulic fluid brake actuating system for the front wheel brakes is in communication with a means for assisting the rear booster unit to provide a lower rate of increase in braking effort on the rear wheels relative to the increase in braking effort on the front wheels.

It is a further object of this invention to provide separate hydraulic fluid brake actuating systems operated by separate vacuum booster units. The front wheel booster unit is intended to be manually operated and the rear booster unit to be controlled by a vacuum valve means in response to the deceleration of the motor vehicle. The front wheel hydraulic brake fluid actuating system is in communication with a means for assisting the rear booster unit and thereby provides a slower rate of increase in braking effort on the rear wheels than on the front wheels at a point beyond which the rear booster unit vacuum is cut off in response to the deceleration of the motor vehicle.

The objects of this invention are accomplished by employing separate hydraulic fluid brake actuating systems for the front wheel brakes and for the rear wheel brakes. The braking systems are operated by vacuum booster units wherein the front booster unit is manually controlled and the rear booster unit is in communication with the vacuum chamber of the front booster unit and controlled by an inertia valve. The inertia valve cuts off the rear booster unit when a predetermined rate of deceleration is reached by the motor vehicle thereby increasing additional braking effort on the front wheels at a rate in response to the actuation of the manual control means. The front hydraulic fluid brake actuating system, however, is in communication with a cylinder and a piston for assisting movement of the power wall in the rear booster unit. In this manner, the rear booster unit increases at a slower rate beyond the cut-off point relative to the front booster unit. This provides a braking on the rear wheels at a slower rate than the front wheels which is nearly proportionate to the shift in the dynamic weight of the motor vehicle as the vehicle is decelerated.

Further objects and advantages of the present invention will be apparent from the following description, reference being had to the accompanying drawings wherein a preferred embodiment of the present invention is clearly shown.

In the drawings:

The drawings illustrate the rear booster unit and its connection with the hydraulic fluid brake actuating system for the front wheel brakes.

The copending application identified above illustrates a device which employs dual booster units which are vacuum operated and the front booster unit is manually controlled. The rear booster unit is controlled through an inertia valve which has cut-out point responsive to a predetermined rate of deceleration of the motor vehicle. This invention is intended to provide an improved result of the previously identified copending application. The manner for achieving this result is by providing a hydraulic fluid assisting means in communication with the front wheel hydraulic brake fluid actuating system. The fluid operates on a piston within a cylinder and assists the power wall in the rear booster unit providing a continual but slower rate of increased braking effort on the rear wheel brakes relative to the front wheel brakes.

Referring to the drawings, a brake pedal 1 is pivotally mounted on the chassis 2 and also pivotally connects a push rod 3. The push rod 3 extends into the front booster unit 4 and manually controls the operation of the booster unit. The front booster unit 4 is connected to the rear booster unit 5 through a vacuum conduit 6. Included in the vacuum conduit 6 is an inertia valve 7. Inertia valve 7 is not shown in detail in this illustration, however, reference may be had to the above-identified copending patent application. This is also true for the front booster unit 4 in which the detailed illustration is included in the copending application. The manner of operation is also set forth in the copending application and so it is believed further description is unnecessary in this patent application.

The front booster unit 4 operates a master piston 8 operating within the master cylinder 9 for pressurizing fluid to actuate the front wheel brakes 10 and 11. An additional conduit 12 is provided in communication with the hydraulic fluid brake actuating system for the front wheel brakes 10 and 11. The conduit 12 feeds into a booster cylinder 13. The booster cylinder 13 receives the booster piston 14 and the seal 15. The seal 15 is resiliently held in place by the spring 16. Fluid is pressurized within the chamber 17 to assist the booster 5.

The rear booster unit 5 actuates the rear wheel brakes 18 and 19 through the hydraulic fluid brake actuating system. The rear booster 5 forces the rear master piston 20 in the master cylinder 21 to pressurize fluid in the chamber 22. The chamber 22 is in communication with the rear wheel brakes 18 and 19 through conventional fluid conduits.

The master cylinder 21 is provided with a reservoir 122 having a reservoir chamber 23. The master cylinder 21 is concentrically mounted with the rear booster unit 5.

The master piston 20 extends into the booster 5 and engages the power wall 24.

The rear booster 5 is formed with a front casing section 25a and a rear casing section 25b for assembling with each other and receiving the bead 26 on the outer periphery of the diaphragm 27. The diaphragm 27 extends radially inward about the rearward side of the diaphragm support 28. The diaphragm support is mounted on the central portion of the power wall and the rearwardly extending portion of the master piston 20.

The power wall 24 is directly connected to the booster piston 14 which is actuated by the front hydraulic fluid brake actuating system.

The rear booster unit 5 is vacuum operated through the same source of vacuum 30 as the front booster unit 4. The front booster unit, however, is manually controlled by the brake pedal 1. The rear booster unit is controlled by an inertia valve 7 in the conduit means connecting the front booster unit 4 and the rear booster unit 5. The power wall is actuated by the air pressure in the air chamber 31 operating against the back side of the power wall 24. The air pressure in the chamber 31 actuates the booster when a vacuum is drawn in the vacuum chamber 32 on the forward side of the power wall 24. The degree of vacuum in chamber 32 is controlled by the inertia valve 7 which is also controlled by the rate of deceleration of the motor vehicle.

The rear booster unit 5 is assisted by fluid in the hydraulic fluid brake actuating system for the front wheels 10 and 11. This assist is present within the booster cylinder 13 on the rearward side of the power wall 24. As the degree of actuation of the front wheel brakes increases, a portion of the fluid is transmitted to the booster cylinder where the pressurized fluid in chamber 17 assists in the forward movement of the power wall 24. At the point where the inertia valve 7 cuts off the vacuum to chamber 32, the fluid in the chamber 17 continues to assist the forward movement of the power wall 24. In this manner, the rear booster unit continues to increase the braking effort while the front booster unit is also increasing the braking effort in the front hydraulic fluid brake actuating system but at a slower rate.

The operation of this invention is described in the following paragraphs. As the brake pedal 1 is depressed, the front booster unit 4 is operated. The operation of the front booster unit is controlled by the movement of the brake pedal and the source of vacuum provides the power for operating the booster unit. The booster unit is directly connected to the front master piston pressurizing fluid within the chamber 40 which is in communication with the wheel cylinders in the front wheel brakes 10 and 11. The front wheel brakes 10 and 11 are actuated directly by the booster unit 4 and in direct proportion to the movement of the pedal 1 in actuating the control valve.

The rear booster unit 5, however, is actuated through the conduit means 6 connecting the front booster unit 4 and the rear booster unit 5. During initial operation of the vehicle brakes, the vacuum chamber 32 in the rear booster 5 is in communication with the vacuum chamber of the front booster 4. In this manner, the actuation of the rear wheel brakes is controlled during initial operation by the vacuum in the front booster unit 4. As the rear booster unit 5 is actuated, the hollow wall 24 moves forwardly, pressurizing fluid within the chamber 22 of the rear master cylinder 21. The pressurization of fluid within the chamber 22 is in communication with wheel cylinders of the rear brakes 18 and 19. In this manner, the rear wheel brakes are actuated simultaneously with the front wheel brakes.

The control valve 7, however, is an inertia controlled valve and operates in response to the deceleration of the motor vehicle. As the motor vehicle reaches a predetermined rate of deceleration, the inertia valve 7 closes off completely thereby preventing further evacuation of the vacuum chamber 32 in the rear booster 5. The vacuum then remains constant in actuation of the rear wheel brakes 18 and 19.

Further actuation on the front wheel brakes due to further movement of the pedal 1 provides an increased braking effort on the front wheel brakes but the decreased vacuum in the vacuum chamber of the front booster unit 4 has no effect on the rear booster unit 5 as the inertia valve 7 is closed. The pressurization of fluid within the chamber 40, however, continues to build up the pressure within the hydraulic wheel cylinders in the front wheel brakes 10 and 11 and also the chamber 17 in the booster cylinder 13. The increased pressure in chamber 17 drives the piston 14 forwardly against the power wall 24. The increase in pressure is in direct proportion to the increase in pressure in the front wheel hydraulic fluid brake actuating system. This pressure continues to increase at a direct rate with the hydraulic fluid front brake actuating system as the chamber 17 is always in communication with the chamber 40 of the front master cylinder 9. With an increase of braking effort on the front wheel brakes 10 and 11, an increase is also realized on the rear wheel brakes 18 and 19. However, due to the differential in area of the piston 14 relative to the piston 8 on the front master cylinder, the increase on the rear brake is at a slower rate once the inertia valve 7 closes off. By proportioning the sizes of the pistons in the front and rear master cylinders as well as the booster cylinder 13, an ideal ratio can be set up whereby the increased braking effort on the rear wheel brakes is very close to the dynamic weight distribution on the four wheels of the vehicle. In this manner, the operation of the rear booster unit depends upon the vacuum operating the front booster unit, the pressure in the front hydraulic fluid system and the rate of deceleration of the motor vehicle.

While the embodiment of the present invention as herein disclosed, constitutes a preferred form, it is to be understood that other forms might be adopted.

What is claimed is as follows:

1. In a vehicle having front and rear wheels and brakes therefor, mechanism comprising, a rear brake master cylinder and power booster and a front brake master cylinder and power booster, means interconnecting said front and rear power boosters so that said rear power booster is operable to provide booster force to said rear master cylinder only when said front power booster is operated, fluid pressure means interconnecting said front and rear master cylinders to provide an additional force on said rear master cylinder proportional to the pressure delivered from said front master cylinder, and deceleration responsive means in said power booster interconnecting means for limiting the power output of said rear power booster to a predetermined maximum.

2. The mechanism defined by claim 1, said master cylinder fluid pressure interconnecting means including a pressure responsive piston and cylinder having an area calibrated to said front master cylinder to provide said additional force after the maximum power output limit of said rear power booster is obtained and in substantially direct relation to the shift of vehicle load distribution to the front wheels during vehicle deceleration.

3. A fluid pressure actuated split braking system for a vehicle having front and rear wheel brakes, said system comprising, a first master cylinder for supplying fluid pressure to said front wheel brakes, a second master cylinder for supplying fluid pressure to said rear wheel brakes, a first pressure differential power booster for actuating said front master cylinder, a second pressure differential power booster for actuating said second master cylinder during a first portion of a vehicle brake application cycle, means interconnecting said first and second pressure differential power boosters for conducting the differential actuating pressure from said first pressure differential power booster to said second pressure differential power booster during said first cycle portion and having vehicle deceleration sensitive means therein modifying the differential actuating pressure delivered to said second pressure differential power booster substantially in inverse relation to the deceleration of the vehicle during the first portion of the vehicle brake application cycle and stopping delivery of said differential actuating pressure to said second pressure differential power booster at a predetermined vehicle deceleration at the end of the first cycle portion, fluid pressure means connected with the output of said first master cylinder and acting on said second master cylinder to exert a force thereon proportional to the output of said first master cylinder in the pressure output increasing direction of said second master cylinder throughout the entire brake application cycle and providing the only additional force to said second master cylinder after said vehicle deceleration sensitive means disconnects said boosters.

4. In a vehicle having front and rear wheel brakes, brake actuating and control means comprising, a front wheel brake booster unit, a hydraulic fluid brake actuating system including first pressurizing means actuated by said front booster unit, a rear wheel brake booster unit, a second hydraulic fluid brake actuating system including second pressurizing means actuated by said rear booster unit, conduit means connecting the vacuum chamber of said front booster unit with the vacuum chamber of said rear booster unit for actuating said rear booster unit at substantially the same brake actuating rate as said front booster unit, an inertia valve in said conduit means providing a cutoff for evacuation of the vacuum chamber of said rear booster unit beyond a predetermined vehicle deceleration rate and thereby reducing the brake actuating rate of said rear booster unit under vacuum influence to zero, an assisting cylinder having an assisting member operating therein and connected to the power wall of said rear booster unit, a fluid chamber formed by said assisting cylinder and said assisting member, fluid pressure conducting means interconnecting said first hydraulic fluid brake actuating system and said fluid chamber and conducting fluid pressure from said first pressurizing means to act on said assisting member and providing assisting force on the power wall of said rear booster unit proportionate to the pressurization of the first hydraulic fluid brake actuating system, said fluid chamber and said first pressurizing means being proportioned to provide said assisting force at a brake actuating rate lower than the brake actuating rate of said front booster unit and to provide said assisting force at that lower rate after the brake actuating rate of said rear booster unit is reduced to zero under vacuum influence.

References Cited in the file of this patent

UNITED STATES PATENTS

| | | |
|---|---|---|
| 2,216,124 | Main | Oct. 1, 1940 |
| 2,402,344 | Price | June 18, 1946 |
| 2,903,100 | Freeman | Sept. 8, 1959 |
| 2,906,561 | Holton | Sept. 29, 1959 |
| 2,922,499 | Ingres | Jan. 26, 1960 |
| 2,934,381 | Hill | Apr. 26, 1960 |

FOREIGN PATENTS

| | | |
|---|---|---|
| 785,634 | Great Britain | Oct. 30, 1957 |